Patented Feb. 18, 1930

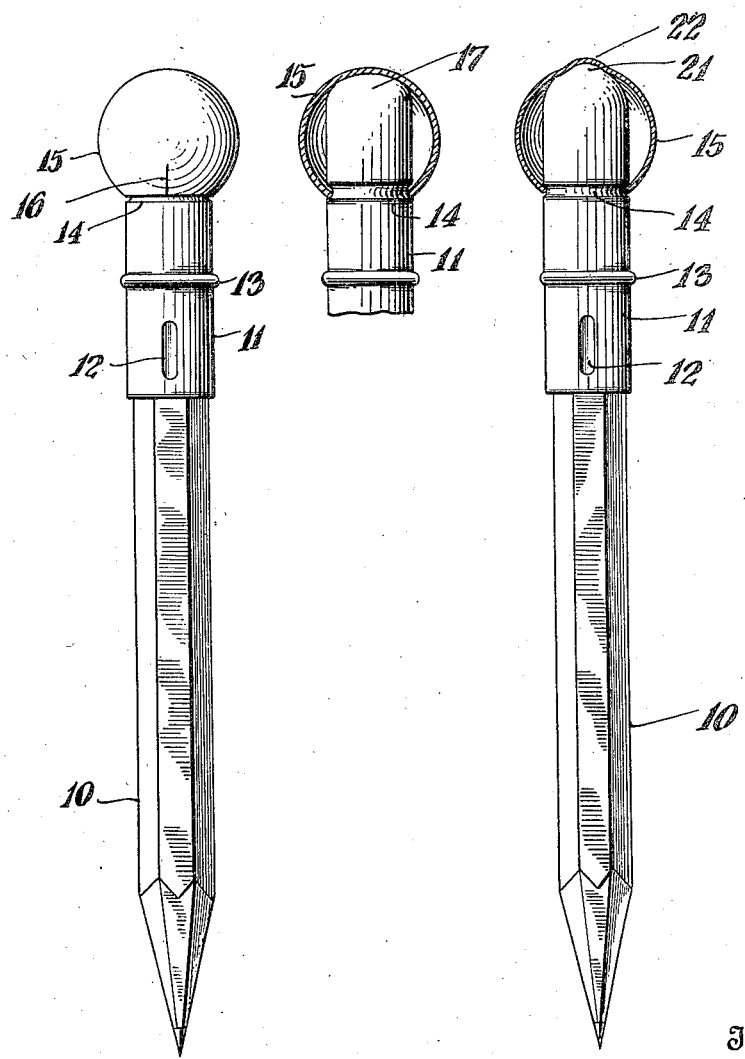

1,747,674

UNITED STATES PATENT OFFICE

HENRY J. KAISER, OF CARLSTADT, NEW JERSEY, ASSIGNOR TO EAGLE PENCIL COMPANY, OF NEW YORK, N. Y., A CORPORATION OF DELAWARE

ATTACHMENT FOR PENCILS AND THE LIKE

Application filed September 8, 1927. Serial No. 218,183.

This invention relates generally to improvements in pencils and the like, but has particular reference to improvements in attachments for pencils and similar instruments by means of which such instruments can conveniently be used for such purposes as operating the call dials of automatic telephones.

One object of the invention is to provide a device of the character indicated which can be manufactured at a low cost, but which will nevertheless be durable and otherwise satisfactory.

With the foregoing and other objects in view, the invention consists in a novel construction and combination of parts, the novel features of which are pointed out in appended claim, and embodiments of which suitable for explaining the invention are hereinafter described, with references to the drawing accompanying and forming a part of this specification.

In said drawings:—

Fig. 1 is an elevation showing a pencil equipped with one of the improved devices.

Fig. 2 is a view similar to Fig. 1 but shows in cross section the construction of one of the parts and the way in which it cooperates with other features of the invention.

Fig. 3 is a view corresponding to Fig. 2, but shows a change which may be made as hereinafter explained.

The construction shown in Figs. 1 and 2 is adapted to use with an ordinary lead pencil 10. It comprises a metal sleeve or cap 11 provided with one or more inwardly formed ribs 12 for engaging the shaft of the pencil, and a circumferentially extending rib 13. Above the rib 13 is a circumferentially extending groove 14 which is engaged by the edge of a circular opening in a hollow, globular element 15. The element 15 is formed from comparatively thin, resilient material which will yield or expand when it is forced down over the cap 11 and contract slightly when the edge of the opening in the element reaches the groove 14, thereby connecting the cap 11 and the element 15 in such a way that a free relative rotary movement of the parts is permitted. This engagement of the parts may be furthered by making the cap 11 also of resilient material which will yield when the parts are being connected.

If heavier or stiffer material is used for making the cap 11 or the element 15, it may be advisable to slit the element at one or more points as shown at 16 or such slits might be made in the cap 11. Either slitting will permit a greater resilient yielding of the material of the parts when they are being connected together.

In the construction illustrated in Figs. 1 and 2, the interior of the element 15 is substantially globular or spherical, and the end of the cap is closed and rounded as at 17, on a radius substantially the same as the radius of the interior of the element. This, in connection with the engagement of the edge of the opening in the element 15 with the groove 14, limits the engaged parts to a rotary relative movement around a fixed axis, a vertical axis when the device is in the position in which it is shown in the drawings, and gives a good bearing contact between the interior of the element and the end of the cap.

In using the device for operating the call dial of a telephone, force is, of course, applied to the element 15 at substantially a right angle to its normal axis of rotation. This will, however, not cause the element to be displaced as the fact that the end of the cap 11 is formed to conform to the interior curvature of the element, and the further fact that the cap extends across the full diameter of the element, will prevent any tilting of the element on the cap, particularly in view of the nature of the engagement of the element with the groove 14. In other words, any tilting is opposed by the groove 14 and the cooperating edge of the opening in the element, and because of the fact that such tilting must be on a radius substantially as great as the interior diameter of the element and will be opposed by engagement of the end of the cap 11 with the interior of the element.

While the construction in Figs. 1 and 2 is highly satisfactory, the rounded end of the cap 11 may be formed as shown at 21 in Fig. 3 to cooperate with a shallow socket formed by suitably shaping the material of the element 15 in the manner illustrated at 22. This gives an additional safeguard against the tilting of the element 15 with respect to its intended axis of rotation and also acts as a pivot bearing and will allow free rotation even though considerable pressure may be applied at a right angle to its normal rotation. When this construction is employed, the rounded end of the cap 11 need not conform closely, as to curvature, with the interior curvature of the element 15.

Except for the differences just pointed out, the construction illustrated in Fig. 3 is or may be the same in all respects as the construction illustrated in Figs. 1 and 2.

While the construction shown and above described are entirely satisfactory for the purposes primarily set forth, the ideas are capable of various embodiments, with suitable modifications and changes, all coming within the scope of the claim which follows.

What is claimed is:

A device of the character described comprising a shell having a substantially spherical interior and a circular opening substantially less in diameter than the diameter of the shell, the material of the shell being formed to produce a shallow socket diametrically opposite said opening, and a cylindrical element provided with a circumferentially extending groove rotatably engaged by the edge of the opening in the shell and having one end rounded on a radius approximating a radius of the interior of the shell with a central projection engaging with the aforesaid shallow socket.

In testimony whereof I hereto affix my signature.

HENRY J. KAISER.